US011428602B2

(12) United States Patent
Lee

(10) Patent No.: US 11,428,602 B2
(45) Date of Patent: Aug. 30, 2022

(54) METHOD AND APPARATUS FOR DETECTING LEAKAGE OF COOLANT IN BATTERY COOLING DEVICE FOR VEHICLE

(71) Applicants: HYUNDAI MOTOR COMPANY, Seoul (KR); KIA MOTORS CORPORATION, Seoul (KR)

(72) Inventor: Gun Goo Lee, Suwon-si (KR)

(73) Assignees: HYUNDAI MOTOR COMPANY, Seoul (KR); KIA MOTORS CORPORATION, Seoul (KR)

(*) Notice: Subject to any disclaimer, the term of this patent is extended or adjusted under 35 U.S.C. 154(b) by 0 days.

(21) Appl. No.: 17/105,161

(22) Filed: Nov. 25, 2020

(65) Prior Publication Data

US 2022/0034746 A1  Feb. 3, 2022

(30) Foreign Application Priority Data

Jul. 28, 2020 (KR) .................. 10-2020-0093489

(51) Int. Cl.
*H01M 10/6567* (2014.01)
*H01M 10/65* (2014.01)
*G01M 3/28* (2006.01)
*H01M 10/42* (2006.01)
*H01M 10/625* (2014.01)

(52) U.S. Cl.
CPC ..... *G01M 3/2815* (2013.01); *H01M 10/4228* (2013.01); *H01M 10/6567* (2015.04); *H01M 10/625* (2015.04); *H01M 2220/20* (2013.01)

(58) Field of Classification Search
None
See application file for complete search history.

(56) References Cited

U.S. PATENT DOCUMENTS

| | | | | |
|---|---|---|---|---|
| 2010/0136391 | A1* | 6/2010 | Prilutsky | H01M 10/6567 429/62 |
| 2014/0020763 | A1* | 1/2014 | Phlegm | B60L 58/26 137/1 |
| 2015/0333379 | A1* | 11/2015 | Janarthanam | H01M 10/48 429/61 |
| 2017/0010176 | A1* | 1/2017 | Inoue | F02C 6/18 |
| 2019/0152343 | A1* | 5/2019 | Onozawa | H01M 10/663 |

FOREIGN PATENT DOCUMENTS

| | | |
|---|---|---|
| KR | 10-1567237 B1 | 11/2015 |
| KR | 10-1704133 B1 | 2/2017 |
| KR | 10-2019-0072328 A | 6/2019 |

* cited by examiner

*Primary Examiner* — Lisa S Park
(74) *Attorney, Agent, or Firm* — Lempia Summerfield Katz LLC

(57) ABSTRACT

A method of detecting a leakage of a coolant in a battery cooling device for a vehicle includes: receiving, by a controller, a first pressure value from a first pressure sensor configured to detect a pressure in a coolant pipe; and determining, by the controller, whether the coolant leaks in the coolant pipe based on the first pressure value.

5 Claims, 2 Drawing Sheets

Figure 1:
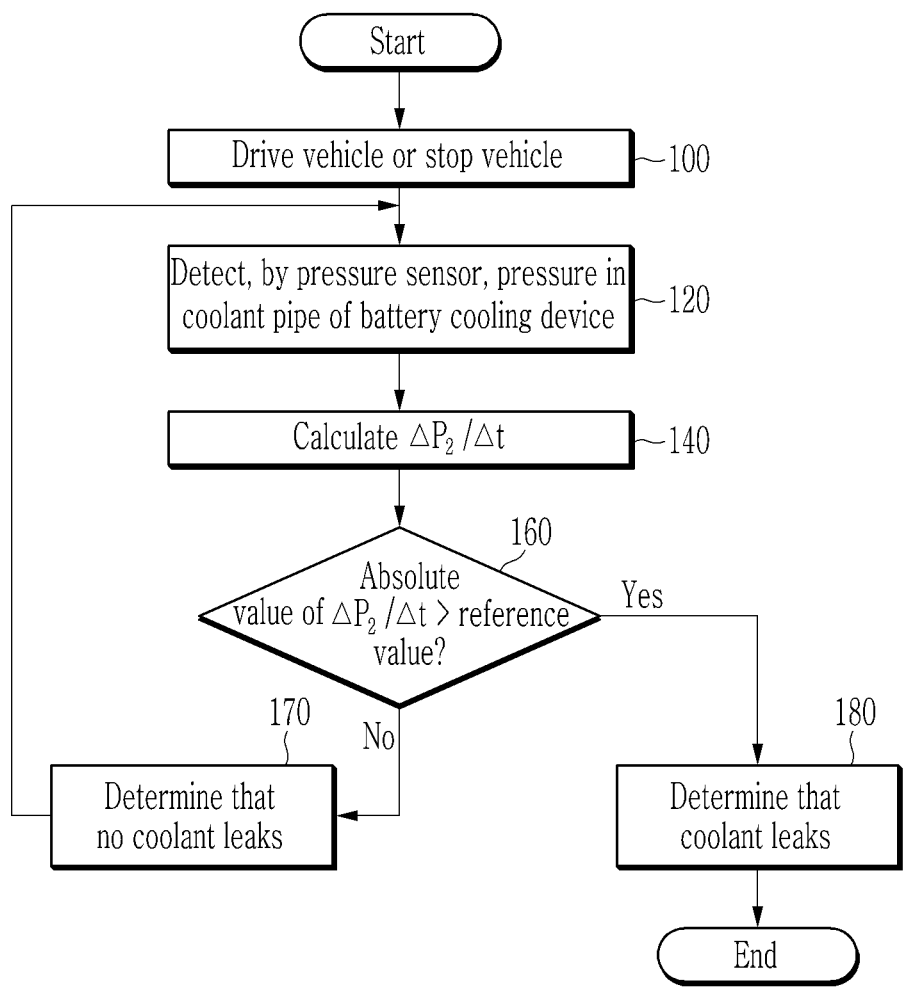

METHOD AND APPARATUS FOR DETECTING LEAKAGE OF COOLANT IN BATTERY COOLING DEVICE FOR VEHICLE

CROSS-REFERENCE TO RELATED APPLICATION

This application claims priority to and the benefit of Korean Patent Application No. 10-2020-0093489, filed on Jul. 28, 2020, the entire contents of which are incorporated herein by reference.

FIELD

The present disclosure relates to a battery for a vehicle.

BACKGROUND

The statements in this section merely provide background information related to the present disclosure and may not constitute prior art.

An environmentally-friendly vehicle such as an electric vehicle or a hybrid vehicle refers to a vehicle that generates power by operating a motor with electrical energy stored in a battery.

In general, internal resistance of the battery is increased in a low temperature region, which causes a deterioration in charging/discharging efficiency. In addition, the battery may be overheated due to heat generated while the battery is charged and discharged, and the overheating of the battery not only degrades the performance of the battery, but also shortens the lifespan of the battery. Therefore, a temperature of the battery needs to be appropriately managed.

An air-cooled technique and a coolant-cooled technique are known as typical battery temperature management techniques. The coolant-cooled technique refers to a technique that manages the temperature of the battery by using a coolant. When the temperature of the battery is lower than a predetermined temperature, the coolant is heated by a temperature raising heater disposed in a coolant path and is then circulated, and when the temperature of the battery is higher than the predetermined reference temperature, the coolant is cooled by a radiator or a chiller and is then circulated.

The above information disclosed in this Background section is only for enhancement of understanding of the background of the disclosure and therefore it may contain information that does not form the prior art that is already known in this country to a person of ordinary skill in the art.

SUMMARY

The present disclosure has been made in an effort to provide a method and an apparatus for detecting a leakage of a coolant in a battery cooling device for a vehicle, which are capable of detecting a leakage of a coolant by using a pressure sensor.

One form of the present disclosure provides a method of detecting a leakage of a coolant in a battery cooling device for a vehicle, the method including: receiving, by a controller, a first pressure value from a first pressure sensor configured to detect a pressure in a coolant pipe in which a coolant to be introduced into the battery of the battery cooling device of the vehicle is moved; and determining, by the controller, whether the coolant leaks in the coolant pipe in which the coolant passing through the battery flows based on the first pressure value.

The method of detecting a leakage of a coolant in a battery cooling device for a vehicle may further include, prior to the receiving of the first pressure value, starting, by the controller, the vehicle driven by the battery to drive the vehicle or stop the vehicle.

The method of detecting a leakage of a coolant in a battery cooling device for a vehicle may further include calculating, by the controller, the amount of leakage of the coolant occurring in the coolant pipe based on a variation value of the first pressure value with respect to time.

The method of detecting a leakage of a coolant in a battery cooling device for a vehicle may further include receiving, by the controller, a second pressure value from a second pressure sensor configured to detect a pressure in a coolant pipe in which the coolant discharged from the battery is moved, in which the controller calculates a position of leakage of the coolant occurring in the coolant pipe based on the first pressure value and the second pressure value.

The method of detecting a leakage of a coolant in a battery cooling device for a vehicle may further include stopping, by the controller, an operation of an electric water pump, which adjusts a flow rate of the coolant discharged from the battery, and turning on a warning light disposed on a cluster of the vehicle when it is determined that the coolant leaks in the coolant pipe.

The first pressure sensor may be installed in the coolant pipe disposed between a chiller configured to cool the battery and a coolant heater configured to heat the battery.

Another form of the present disclosure provides an apparatus for detecting a leakage of a coolant in a battery cooling device for a vehicle, the apparatus including: a first pressure sensor configured to detect a pressure in a coolant pipe in which a coolant to be introduced into a battery of the battery cooling device of the vehicle is moved; and a controller configured to receive a first pressure value from the first pressure sensor, in which the controller determines whether the coolant leaks in the coolant pipe in which the coolant passing through the battery flows based on the first pressure value.

Prior to receiving the first pressure value, the controller may start the vehicle driven by the battery to drive the vehicle or stop the vehicle.

The controller may calculate the amount of leakage of the coolant occurring in the coolant pipe based on a variation value of the first pressure value with respect to time.

The apparatus for detecting a leakage of a coolant in a battery cooling device for a vehicle may further include a second pressure sensor configured to detect a pressure in a coolant pipe in which the coolant discharged from the battery is moved, in which the controller receives the second pressure value, and the controller calculates a position of leakage of the coolant occurring in the coolant pipe based on the first pressure value and the second pressure value.

When it is determined that the coolant leaks in the coolant pipe, the controller may stop an operation of an electric water pump, which adjusts a flow rate of the coolant discharged from the battery, and turn on a warning light disposed on a cluster of the vehicle.

The first pressure sensor may be installed in the coolant pipe disposed between a chiller configured to cool the battery and a coolant heater configured to heat the battery.

The method and the apparatus for detecting a leakage of a coolant in a battery cooling device for a vehicle according to the exemplary form of the present disclosure may sense (detect) a leakage of a coolant in a battery cooling device for a vehicle by using the pressure sensor, thereby improving safety of a vehicle driver.

The exemplary form of the present disclosure may detect a leakage of the coolant regardless of a vehicle driving condition such as a condition in which the vehicle is driven or stopped.

In addition, the exemplary form of the present disclosure may detect a leakage of the coolant by using one pressure sensor, and detect a position of a leakage of the coolant by using two pressure sensors.

Further areas of applicability will become apparent from the description provided herein. It should be understood that the description and specific examples are intended for purposes of illustration only and are not intended to limit the scope of the present disclosure.

DRAWINGS

Figure 2:
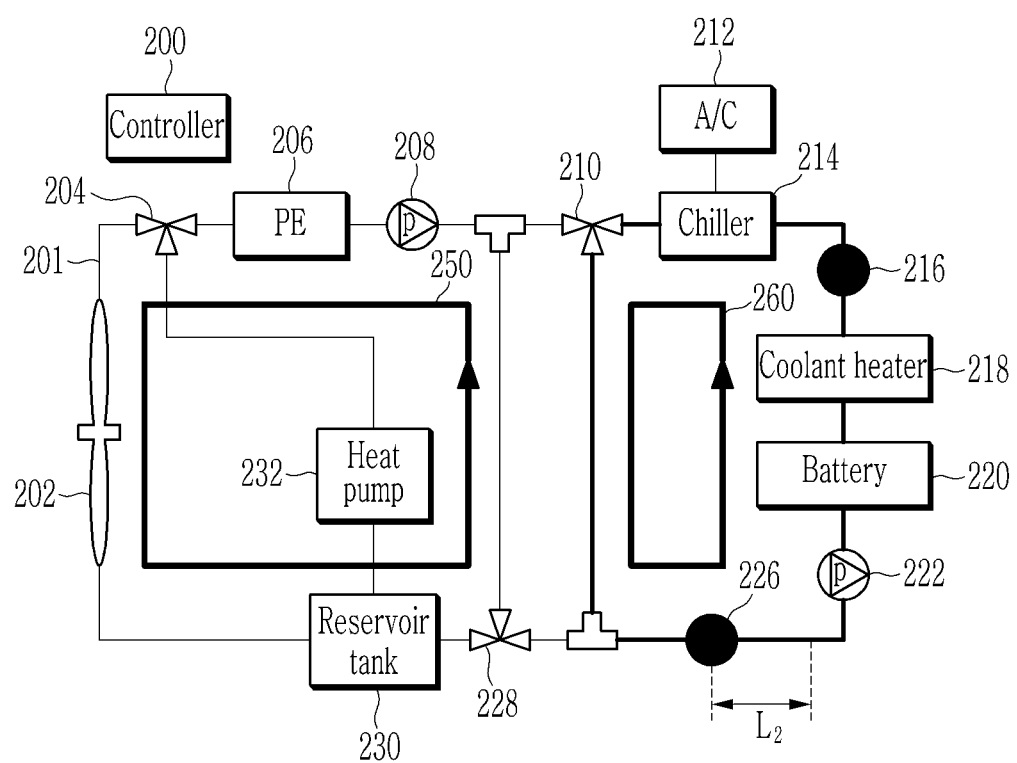

In order that the disclosure may be well understood, there will now be described various forms thereof, given by way of example, reference being made to the accompanying drawings, in which:

FIG. 1 is a flowchart for explaining a method of detecting a leakage of a coolant in a battery cooling device for a vehicle according to one form of the present disclosure; and FIG. 2 is a view for explaining an apparatus for detecting a leakage of a coolant in a battery cooling device for a vehicle to which the method of detecting a leakage of a coolant in a battery cooling device for a vehicle illustrated in FIG. 1 is applied.

The drawings described herein are for illustration purposes only and are not intended to limit the scope of the present disclosure in any way.

DETAILED DESCRIPTION

In order to sufficiently understand the present disclosure and the object to be achieved by carrying out the present disclosure, reference needs to be made to the accompanying drawings for illustrating various forms of the present disclosure and contents disclosed in the accompanying drawings.

Hereinafter, various forms of the present disclosure will be described in detail with reference to the accompanying drawings. In the description of the present disclosure, the specific descriptions of publicly known related configurations or functions will be omitted when it is determined that the specific descriptions may obscure the subject matter of the present disclosure. Like reference numerals indicated in the respective drawings may refer to like components.

The terms used in the present specification are used only for the purpose of describing particular forms and are not intended to limit the present disclosure. Singular expressions include plural expressions unless clearly described as different meanings in the context. In the present specification, it should be understood the terms "comprises," "comprising," "includes," "including," "containing," "has," "having" or other variations thereof are inclusive and therefore specify the presence of stated features, integers, steps, operations, elements, components, or combinations thereof, but do not preclude the presence or addition of one or more other features, integers, steps, operations, elements, components, or combinations thereof.

Throughout the present specification, when one constituent element is referred to as being "connected to" another constituent element, one constituent element can be "directly connected to" the other constituent element, and one constituent element can also be "electrically or mechanically connected to" the other constituent element with other constituent elements therebetween.

Unless otherwise defined, the terms used herein, including technical or scientific terms, have the same meaning as commonly understood by those skilled in the art to which the present disclosure pertains. The terms such as those defined in a commonly used dictionary should be interpreted as having meanings consistent with meanings in the context of related technologies and should not be interpreted as ideal or excessively formal meanings unless explicitly defined in the present specification.

A capacity of a high-voltage battery for driving an electric vehicle is increased as a traveling distance of the electric vehicle is increased. In order to shorten the time taken to charge the high-voltage battery at a high speed, a coolant-cooled cooling system using a coolant is used for a method of cooling the high-voltage battery.

We have discovered that if the battery is heated to a high temperature because the battery is not smoothly cooled, output power required for the vehicle is limited, or a motor (drive motor) and an inverter, which are supplied with power from the battery, are overheated, which may cause a deterioration in output of the motor and the inverter or cause a failure of function. We have also discovered that if the coolant leaks in the battery system, an electrical short circuit may occur.

FIG. 1 is a flowchart for explaining a method of detecting a leakage of a coolant in a battery cooling device for a vehicle according to one form of the present disclosure. FIG. 2 is a view for explaining an apparatus for detecting a leakage of a coolant in a battery cooling device for a vehicle to which the method of detecting a leakage of a coolant in a battery cooling device for a vehicle illustrated in FIG. 1 is applied.

Referring to FIGS. 1 and 2, in starting step 100, a controller 200 including a battery management system (BMS) may start an electric vehicle and drive or stop the vehicle. The operation of the BMS may be operated (activated) when the vehicle is started.

The controller 200 is an electronic control unit (ECU) capable of controlling all operations of the vehicle including a battery cooling device of the vehicle. For example, the controller 200 may be one or more microprocessors operated by a program (control logic) or hardware (e.g., a microcomputer) including the microprocessor, and the program may include a series of instructions for performing the method of detecting a leakage of a coolant in a battery cooling device for a vehicle according to one form of the present disclosure. The instruction may be stored in a memory included in the controller 200.

The battery cooling device for a vehicle (a battery cooling circuit for a vehicle) included in the vehicle may include the controller 200, a radiator 202 configured to cool a coolant; a three-way valve 204 configured to adjust a flow direction of the coolant, a power element (PE) 206 such as a drive motor, an electric water pump (EWP) 208 configured to adjust the amount of flowing coolant, a three-way valve 210 configured to adjust a flow direction of the coolant, an air conditioner 212 configured to cool or heat the interior of the vehicle, a chiller (battery chiller) 214 configured to cool a battery 220, a first pressure sensor 216, a coolant heater 218 configured to heat the battery 220, the battery 220 configured to be used to drive the vehicle, an electric water pump 222 configured to adjust the amount of flowing coolant, a second pressure sensor 226, a three-way valve 228 configured to adjust a flow direction of the coolant, a reservoir tank 230, and a heat pump 232 configured to absorb heat from the coolant.

The constituent elements including the radiator 202 of the battery cooling device of the vehicle may be connected through coolant pipes or coolant lines 201. In another form of the present disclosure, the air conditioner 212 connected to the chiller 214 may be omitted from the battery cooling device of the vehicle.

The battery 220 and the power element 206 are constituent elements to be cooled, the electric water pumps 208, 222 are constituent elements for circulating the coolant, the chiller 214, the coolant heater 218, the radiator 202, and the heat pump 232 are constituent elements for adjusting the temperature of the coolant, the three-way valves 204, 210, 228 are constituent elements for adjusting paths of the coolant, and the reservoir tank 230 is a constituent element for storing the coolant.

The apparatus for detecting a leakage of a coolant in a battery cooling device for a vehicle may include the controller 200, the first pressure sensor 216, and the second pressure sensor 226.

According to step 120 illustrated in FIG. 1, the controller 200 may control the first pressure sensor 216 to detect a pressure in the coolant pipe 201 in which the coolant to be introduced into the battery 220 is moved. For example, the first pressure sensor 216 may be installed in the coolant pipe 201 between the chiller 214 and the battery 220. The controller 200 may control the second pressure sensor so that the second pressure sensor 226 detects a pressure in the coolant pipe 201 in which the coolant discharged from the battery 220 is moved. For example, the second pressure sensor 226 may be installed at a rear end of the electric water pump 222.

According to step 140, the controller 200 may calculate a variation value $$\frac{\Delta p_2}{\Delta t}$$

of the first pressure value with respect to time

According to step 160, the controller 200 may determine whether an absolute value of the variation value $$\frac{\Delta p_2}{\Delta t}$$

of the first pressure value with respect to time exceeds a reference value (e.g., 0).

When the absolute value of the variation value $$\frac{\Delta p_2}{\Delta t}$$

of the first pressure value is equal to or smaller than the reference value, the process of the method of detecting a leakage of a coolant in a battery cooling device for a vehicle may go to step 170, and when the absolute value of the variation value $$\frac{\Delta p_2}{\Delta t}$$

of the first pressure value is larger than the reference value, the process of the method of detecting a leakage of a coolant in a battery cooling device for a vehicle may go to step 180.

According to step 170, the controller 200 may determine that no coolant leaks from the coolant pipe 201 in which the coolant passing through the battery 220 flows. After step 170, the controller 200 may allow the process of the method of detecting a leakage of a coolant in a battery cooling device for a vehicle to go to step 120.

According to step 180, the controller 200 may determine that the coolant leaks from the coolant pipe 201 in which the coolant passing through the battery 220 flows. For example, when the variation value of the first pressure value with respect to time, which is a pressure variation gradient, continues for a specific time (e.g., 20 seconds), the controller 200 may determine that the coolant leaks from the coolant pipe 201.

The controller 200 may calculate the amount $Q_L$ of leakage of the coolant that occurs in the coolant pipe 201 based on the variation value of the first pressure value with respect to time. For example, the controller 200 may calculate the amount $Q_L$ of leakage of the coolant by using the following equation.

$$Q_L = \frac{A_t}{\rho g} \frac{\Delta p_2}{\Delta t}$$

In the above equation, $A_t$ is a cross-sectional area of the coolant pipe, $\rho$ is density of the coolant, and g is gravitational acceleration.

The controller 200 may calculate a position of leakage of the coolant that occurs in the coolant pipe 201 based on the first pressure value and the second pressure value. For example, the controller 200 may use the following equation to calculate the position $L_2$ of leakage of the coolant which is spaced apart from a position at which the second pressure sensor 226 is installed.

$$L_2 \cong \frac{p_1 - p_2}{1.75 \alpha Q_1^{0.75} Q_L}$$

In the above equation, $P_2$ is a first pressure value, $\alpha$ is an experimental constant for determining the position of leakage of the coolant, and $Q_1$ is a flow rate of the coolant at a position at which the second pressure sensor 226 is in the direction.

When it is determined that the coolant leaks in the coolant pipe 201, the controller 200 may stop the operation of the electric water pump 222, which adjusts a flow rate of the coolant discharged from the battery 220, and turn on a warning light disposed on a cluster of the vehicle. In addition, when it is determined that the coolant leaks in the coolant pipe 201, the controller 200 may stop the operation of the electric water pump 208, which adjusts a flow rate of the coolant discharged from the power element 206, and control the three-way valves 204, 210, 228, as indicated by reference numerals 250, 260 in FIG. 2, thereby changing a flow direction of the coolant in the battery cooling device of the vehicle.

The components, "units", blocks, or modules used in the exemplary forms of the present disclosure may be implemented in software such as a task, class, sub-routine, process, object, execution thread or program, which is performed on a certain memory area, hardware such as a field programmable gate array (FPGA) or an application specific integrated circuit (ASIC), and/or a combination of the software and the hardware. The components or the units may be included in computer-readable media or some of the components or the units may be dispersed and distributed in a plurality of computers.

As described above, various forms have been described with reference to the drawings and the specification. In this case, specific terms used herein are used only for the purpose of describing the present disclosure, but not used to limit the meaning or the scope of the present disclosure disclosed in the claims. Accordingly, those skilled in the art will understand that various modifications of the present disclosure and other exemplary forms equivalent thereto may be implemented. Accordingly, the true technical protection scope of the present disclosure should be determined by the technical spirit of the appended claims.

DESCRIPTION OF SYMBOLS

200: Controller
204: Chiller
216: First pressure sensor
220: Battery
226: Second pressure sensor

What is claimed is:

1. A method of detecting a leakage of a coolant in a battery cooling device for a vehicle, the method comprising:
receiving, by a controller, a first pressure value from a first pressure sensor configured to detect a first pressure in a coolant pipe;
determining, by the controller, whether the coolant is leaking in the coolant pipe based on the first pressure value;
receiving, by the controller, a second pressure value from a second pressure sensor configured to detect a second pressure in the coolant pipe; and
calculating, by the controller, a position of leakage of the coolant occurring in the coolant pipe based on the first pressure value and the second pressure value.

2. The method of claim 1 further comprising:
prior to the receiving of the first pressure value, starting, by the controller, the vehicle and driving or stopping the vehicle.

3. The method of claim 1 further comprising:
calculating, by the controller, an amount of leakage of the coolant occurring in the coolant pipe based on a variation value of the first pressure value with respect to time.

4. The method of claim 1, further comprising:
stopping, by the controller, an operation of an electric water pump, and turning on a warning light disposed on a cluster of the vehicle when it is determined that the coolant leaks in the coolant pipe.

5. The method of claim 1, wherein
the first pressure sensor is installed in the coolant pipe disposed between a chiller configured to cool a battery and a coolant heater configured to heat the battery.

* * * * *